Figure 1:
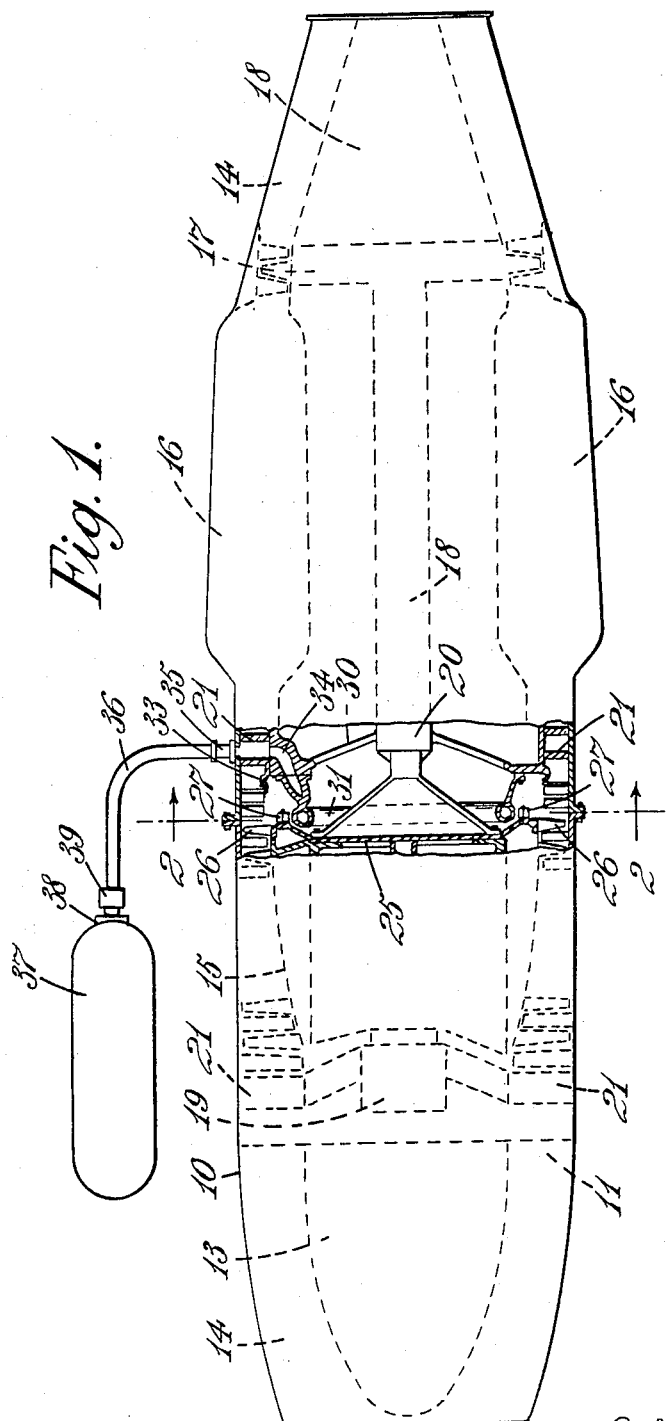

June 5, 1956  G. M. LEWIS  2,749,023
GAS TURBINE ENGINES
Filed Feb. 9, 1953  4 Sheets-Sheet 1

INVENTOR
G. M. LEWIS
BY Wilkinson & Mawhinney
ATTYS.

June 5, 1956  G. M. LEWIS  2,749,023
GAS TURBINE ENGINES
Filed Feb. 9, 1953  4 Sheets-Sheet 2

INVENTOR
G. M. LEWIS
BY Wilkinson & Mawhinney
ATTYS.

June 5, 1956 G. M. LEWIS 2,749,023
GAS TURBINE ENGINES
Filed Feb. 9, 1953 4 Sheets-Sheet 3

INVENTOR
G. M. LEWIS
BY Wilkinson & Mawhinney
ATTYS.

United States Patent Office 2,749,023
Patented June 5, 1956

2,749,023
GAS TURBINE ENGINES

Gordon Manns Lewis, Bristol, England, assignor to The Bristol Aeroplane Company Limited, Bristol, England, a British company Application February 9, 1953, Serial No. 335,634

Claims priority, application Great Britain February 18, 1952

13 Claims. (Cl. 230—116)

This invention relates to gas turbine engines and concerns means for starting rotary compressor gas turbine plant.

The conventional method of starting gas turbine engines is by means of a starting motor designed as an attached accessory and operating through gearing and disengaging mechanism. This arrangement necessarily involves a considerable increase in complexity and weight of the complete plant. With a view to avoiding this it has been proposed to direct a jet of compressed air, or hot gas from a cartridge firing system, directly on the main turbine blades of the plant. This scheme however also suffers from disadvantages, namely that it is inefficient owing to the main turbine blading not being ideally suited to the conditions arising when the starting jet is used and also that modification of the main turbine casing to provide for the starting jets can give rise to distortion under normal running conditions unless a weight penalty is accepted to enable the casing to be suitably stiffened.

It has also been proposed to provide an annular ring of lateral buckets formed in the exhaust side of a disc carrying the main turbine blades of a gas turbine plant, the stationary structure adjacent the disc being adapted to support cartridges for directing hot gas onto said buckets to start the plant. This proposal however also involves increase in weight and complexity of the plant as well as modification of the turbine casing to allow access for fitting the cartridges of the cartridge firing system with the attendant disadvantage referred to above.

The object of the present invention is to provide a simple and light starting system which largely eliminates objections referred to above and is applicable to any kind of gas turbine plane incorporating a rotary compressor.

According to the present invention a rotary compressor gas turbine plant is provided with a ring of starting blades carried from, adjacent to, and coaxial with a compressor rotor member of the plant, and means to conduct air from an accessible pipe coupling member on fixed structure associated with the plant to a nozzle or the like which is carried by fixed structure of the plant and which is arranged to direct air on to said blades thereby to rotate said rotor member and start said plant, said coupling member being adapted for attachment to, and detachment from, an air line from a source of air under pressure.

The starting blades are distinct from the main turbine blades of the plant and are shaped and provided solely for performing the function of starting the plant.

According to a feature of the present invention the starting blades are carried from a disc which also carries moving compressor blades, and, in the case of an axial flow compressor, preferably by the disc which carries the last row of moving blades of the compressor at the exhaust end of the compressor.

According to another feature of the present invention said starting blades are arranged at a smaller radius than said compressor blades. The starting blades are however arranged at a sufficient radius to provide the torque necessary for starting the plant.

The starting turbine blades may be either of the tangential admission type or of the radial flow type as may be convenient in a particular design of plant, and the exhaust from them may either be discharged separately or may mix with the main airstream passing through the plant.

Figure 2:
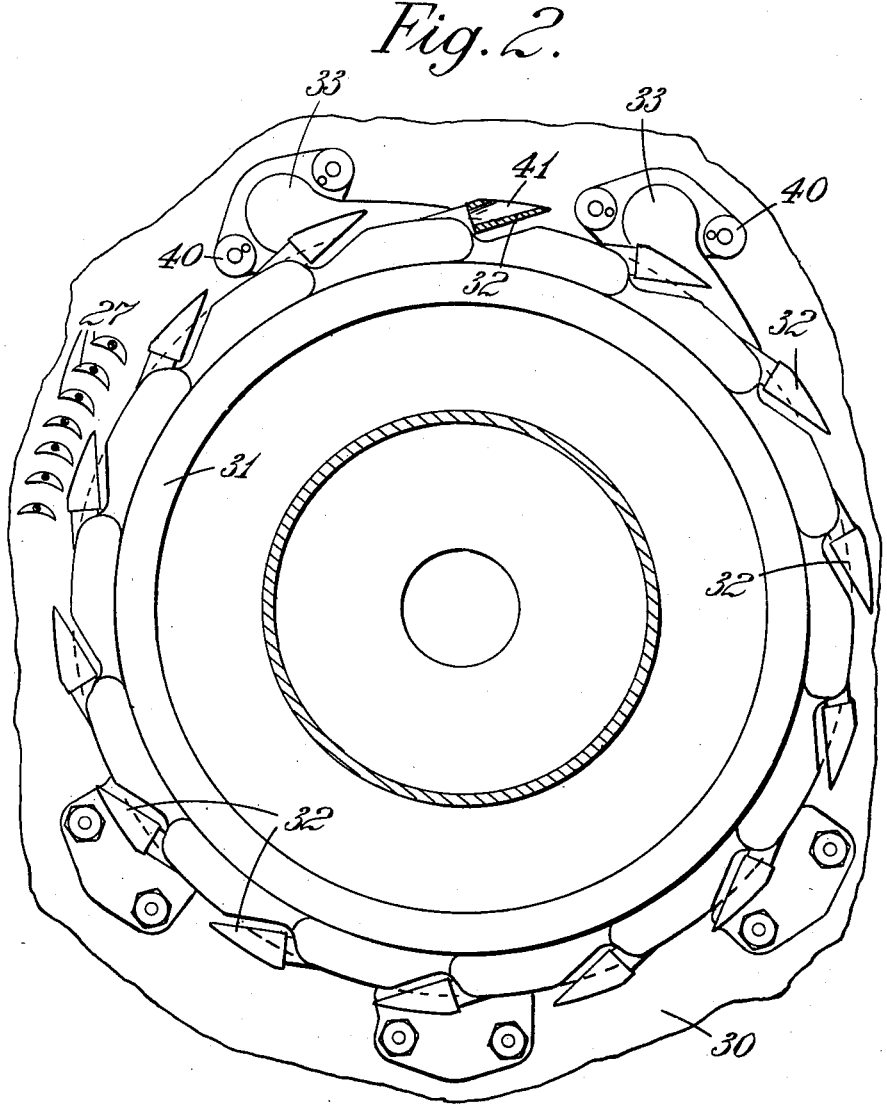
Figure 3:
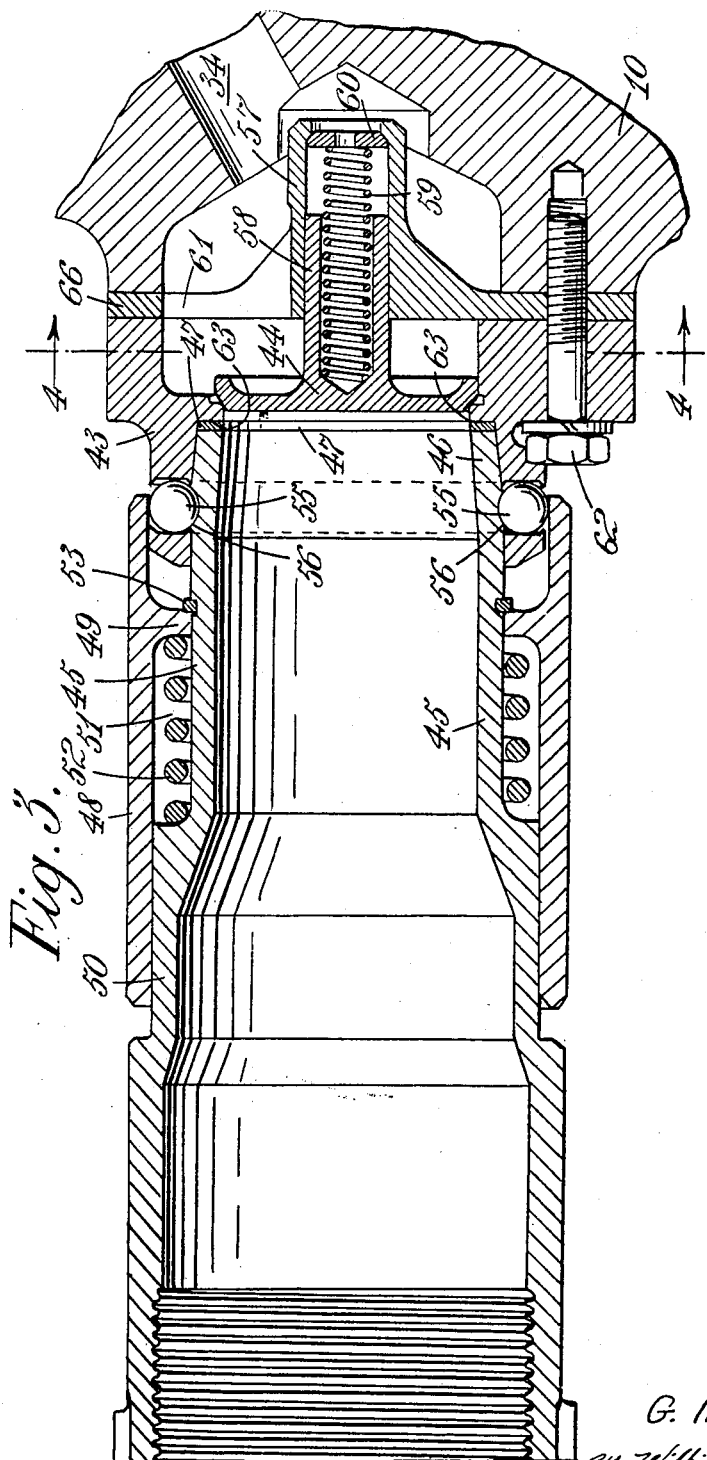
Figure 4:
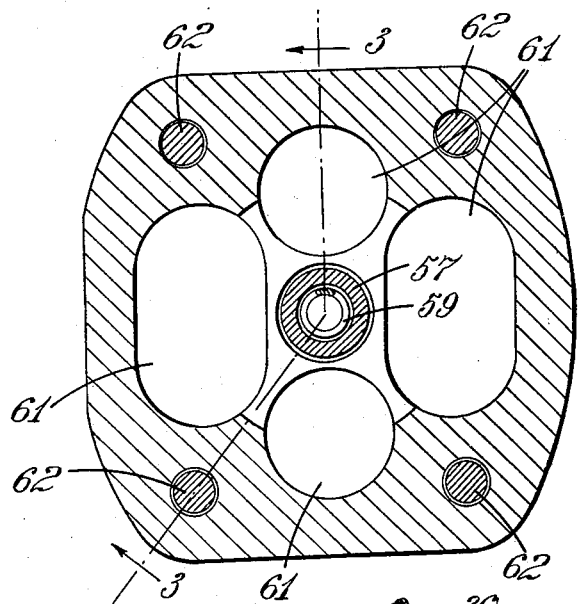
Figure 5:
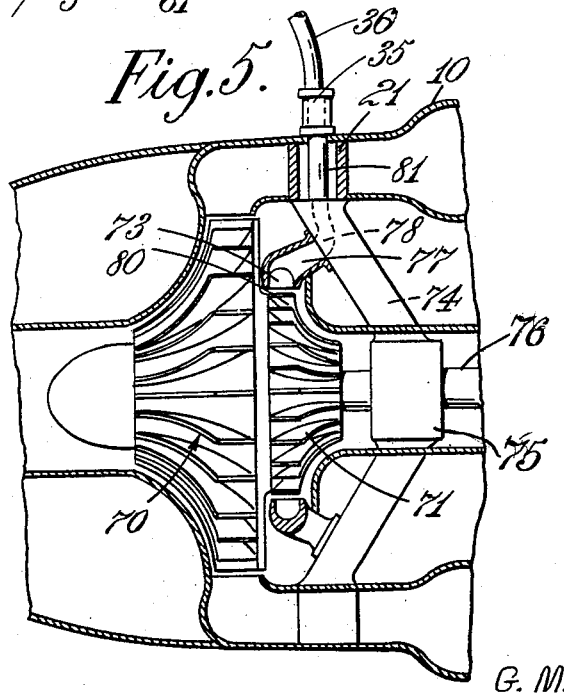

Two embodiments of the invention will now be described, by way of example, with reference to the accompanying drawings whereof:

Figure 1 is a side elevation of a rotary compressor gas turbine plant with part broken away to show the means for starting the plant, Figure 2 is a partial view on line 2—2 of Figure 1, Figure 3 is a side elevation in cross section of a pipe coupling, Figure 4 is a view on line 4—4 of Figure 3, and Figure 5 is a partial diagrammatic view, in side elevation, of another rotary compressor gas turbine plant incorporating the present invention.

Referring to Figure 1, the plant comprises an outer casing 10 defining an air duct 11 passing fore and aft through the plant. Mounted within the casing 10 in axial sequence there is provided a nose portion 13 which forms, with the casing 10, an annular air intake 14 for the plant, an axial flow compressor 15, combustion equipment 16, a turbine 17, and a tailpiece 18 which forms with the casing 10 an annular outlet 14 for the working gases discharged from the plant as a propulsive jet.

The compressor 15 and the turbine 17 are drivingly coupled by a shaft 18 journalled in bearings 19, 20 carried from the casing 10 in part by hollow aerofoil members 21 passing radially across the duct 11.

According to the invention, a disc 25 carrying the last row of moving blades 26 of the compressor 15, also carries a ring of rearwardly extending starting blades 27 at a radius less than the blades 26, but sufficient to provide the necessary torque for starting the plant. Within the ring of starting blades 27 there is carried, from the adjacent stationary structure 30, an annular manifold 31 having a plurality of nozzles 32 (see Figure 2), and a pair of inlet ducts 33 each of which communicates with a duct 34 in the structure 30. In Figure 1, only one of the ducts 33 and 34 are shown. The ducts 34 each open into a hollow aerofoil member 21 which in turn communicates with a pipe coupling, constituted by a quick release fastening such as is generally indicated at 35, carried on the casing 10. The two couplings 35 are positioned at accessible points on the casing 10, and one may be subsequently blanked off after the plant is installed, for example in an aeroplane, the most conveniently positioned coupling being used to feed air to the starting blades.

Each coupling 35 is adapted for attachment to an air line 36 leading to a storage bottle 37 containing air under high pressure for example 6000 pounds per square inch. The air line 36 includes a starting valve 39 and a pressure reducing valve 38 to reduce the pressure of air to a lower value, for example, 200 lbs. per square inch suitable for the efficient operation of the starting system. Either, or both the valves 38 and 39 may be positioned between their associated coupling 35 and the manifold 31 if desired, that is, carried within the casing 10, and, in this case, the starting valve is controlled from a control panel for the plant.

Referring to Figure 2, the manifold 31 is bolted to the stationary structure 30 by means of bolts 40. The nozzles 32 are each outwardly directed and have divergent exits 41. The inlet ducts 33 are also arranged to sweep tangentially into the manifold to provide a smooth entry of air into the manifold. For this reason, the duct 33 in Figure 1 does not appear to communicate with the interior of the manifold 31. The blades 27 are of the tangential admission type and are arranged in well known manner immediately adjacent the nozzles 32.

Referring to Figures 3 and 4, each coupling comprises a female element or sleeve 43 carried on the casing 10 and forming one half of a housing for a non-return valve 44, and a male element or sleeve 45 carried by the air line 36 and having a tapering nose portion 46 adapted for insertion into the sleeve 43. The portion 46 carries a sealing ring 47 which abuts a step 63 when the portion 46 is fully inserted. The sleeve 45 has a cuff 48 provided with an inwardly directed flange 49, the cuff sliding on an annular step 50, and the flange 49 defining with the step 50 sleeve 45 and cuff 48 an annular space 51 which houses a coiled spring 52 tending to urge the flange 49 against an abutment ring 53. The sleeve 43 houses four ball catches 55 which project internally and externally of the sleeve and are adapted to engage in a circumferential groove 56 in the portion 46 to retain the sleeve 45 within the sleeve 43, the catches 55 being held in the depressions by the cuff 48 as shown in Figure 3.

The housing for the valve 44 is completed by plate 66 having a central tubular boss 57 in which the hollow valve stem 58 slides. The valve 44 is held in place by a coil spring 59 which is housed within the stem 58 and the boss 57 and abuts a ring 60 in the end of the tube 57. The plate 66 has four apertures 61 (see Figure 4) and is bolted together with the sleeve 43 to the casing 10 of the plant by means of bolts 62.

In order to detach the air line 36 the sleeve 45 is pulled out of the sleeve 43 by means of the cuff 48. The cuff slides back against the action of spring 52 thereby releasing the catches 55 which ride out of the depressions 56 thus releasing the sleeve 45.

In order to attach the air line 36, the air line is grasped beyond the cuff 48 and the sleeve 45 pushed into the sleeve 43. The portion 46 when entering the sleeve 43 causes the catches 55 to project externally of the sleeve and the cuff 48 engages the catches and is forced back against the action of spring 52. When the portion 46 has been fully entered into the sleeve 43 the catches 55 are forced into the depressions 56 by the cuff 48 when then returns to its position as shown in Figure 3. The coupling described provides a quick release fastening for the air line once the plant is running. The non-return valve 44 then prevents the escape of compressed air exhausted from the compressor 15. In this connection it will be noted from Figure 1 that the air from the storage bottle 37 after passing through a hollow aerofoil member 21, a duct 34 in structure 30, an inlet duct 33, manifold 31 and nozzles 32, passes over the starting blades 27 and is exhausted into the main duct 11 passing through the plant. The starting air ducting accordingly puts a high pressure region in communication with the exterior of the casing 10 when the plant is running and it is for this reason that the valve 44 is provided.

In an alternative arrangement which is illustrated in Figure 5, the plant is provided with a centrifugal compressor generally indicated at 70. The starter blades or vanes 71 are arranged on the back of the impeller of the compressor 70 and are of an inward radial flow type.

An annular manifold 73 is carried from the adjacent stationary structure 74, which also supports a journal bearing 75 for the compressor shaft 76, and surrounds the vanes 71. The manifold is provided with a pair of inlet ducts such as 77 which communicate each with a duct 78 in the structure 74, the ducts 78 each communicating in turn with a pipe 81 which passes through a hollow aerofoil member 21 to a coupling 35 as previously described, carried on the casing 10. The manifold 73 is provided with a plurality of openings 80 through which the air from the air line 36 flows in an inward radial direction between the starting blades 71 to start the plant, and from thence the air is separately exhausted to atmosphere.

With the arrangements described, the only parasitic weight is the starting blades or vanes, the starting air supply conduits, and the manifold. This is of importance in keeping the weight factor to a minimum when the plant is used for the propulsion of aircraft and missiles. Also, since the aerofoil members 21, normally provided to support the journal bearing support structure of the compressor, are used to convey the starting air to the starting blades no important structural changes are necessary in the design of the compressor.

I claim:
1. In a rotary compressor gas turbine plant comprising a fixed structure, a compressor and a turbine through both of which a working medium passes in succession, the working medium compressed in said compressor being subsequently expanded through said turbine, said compressor and said turbine each having a blade carrying rotor member and said rotor members being drivingly coupled together so that during normal operation of said plant said turbine drives said compressor rotor, a ring of starting blades directly attached to said compressor rotor member co-axially therewith, a nozzle on said fixed structure and arranged to direct air upon said starting blades, whereby to rotate said compressor rotor member and start the plant, and means adapted to conduct air from a source of air under pressure to said nozzle comprising a coupling member adapted to be connected to the source of air, said starting blades being positioned out of the path of movement of the working medium.

2. Gas turbine plant as claimed in claim 1 wherein the starting blades are carried from a disc which also carries moving compressor blades.

3. Gas turbine plant as claimed in claim 2 wherein said compressor blades are the last row of moving compressor blades at the exhaust end of an axial flow compressor.

4. Gas turbine plant as claimed in claim 2, wherein said starting blades are arranged at a smaller radius than said compressor blades.

5. Gas turbine plant as claimed in claim 1 wherein said starting blades are of the tangential admission type.

6. Gas turbine plant as claimed in claim 5 wherein said air conducting means includes an annular manifold having a plurality of nozzles at its outer periphery for directing compressed air onto the starting blades, the manifold being positioned within the ring of starting blades.

7. Gas turbine plant as claimed in claim 1 wherein said starting blades are of the radial flow type.

8. Gas turbine plant as claimed in claim 7 wherein said air conducting means includes an annular manifold having a plurality of openings directed radially inwardly, the manifold being positioned radially outside said ring of starting blades.

9. Gas turbine plant as claimed in claim 1 wherein said air conducting means passes through or includes a hollow aerofoil member which is used to support a bearing of the compressor rotor from the outer casing of the compressor.

10. Gas turbine plant as claimed in claim 1 wherein said coupling member is carried on the plant casing.

11. Gas turbine plant as claimed in claim 1 wherein said coupling member provides a part of a quick release fastening.

12. Gas turbine plant as claimed in claim 1 wherein said coupling member is a pipe coupling member and houses a non-return valve.

13. In a rotary compressor gas turbine plant having a compressor and a turbine through both of which a working medium passes in succession, the working medium compressed in said compressor being subsequently expanded through said turbine, said compressor and said turbine each having a blade carrying rotor member and said rotor members being drivingly coupled together so that during normal operation of said plant said turbine drives said compressor rotor, a ring of starting blades mounted on the compressor rotor member out of the path of movement of the working medium, and conducting means adapted to conduct compressed air from a source of air under pressure and direct it against said starting blades to rotate the compressor rotor member and start the plant.

References Cited in the file of this patent

UNITED STATES PATENTS

| | | |
|---|---|---|
| 1,165,794 | McClave | Dec. 28, 1915 |
| 1,926,225 | Birmann | Sept. 12, 1933 |
| 2,411,552 | New | Nov. 26, 1946 |
| 2,447,292 | Van Acker | Aug. 17, 1948 |
| 2,473,356 | Birmann | June 14, 1949 |
| 2,613,501 | Price | Oct. 14, 1952 |

FOREIGN PATENTS

| | | |
|---|---|---|
| 616,695 | Great Britain | Jan. 26, 1949 |
| 685,830 | France | July 17, 1930 |